United States Patent
Lancaster et al.

(10) Patent No.: US 8,332,495 B2
(45) Date of Patent: Dec. 11, 2012

(54) SYSTEM AND METHOD FOR SECURING A WIRELESS NETWORK

(75) Inventors: Arthur Lancaster, Austin, TX (US); Melissa Simpler, Austin, TX (US); Todd Greer, Austin, TX (US)

(73) Assignee: Affinegy, Inc., Austin, TX (US)

( * ) Notice: Subject to any disclaimer, the term of this patent is extended or adjusted under 35 U.S.C. 154(b) by 313 days.

(21) Appl. No.: 12/492,184

(22) Filed: Jun. 26, 2009

(65) Prior Publication Data

US 2009/0327440 A1 Dec. 31, 2009

Related U.S. Application Data

(60) Provisional application No. 61/076,209, filed on Jun. 27, 2008.

(51) Int. Cl.
*G06F 15/177* (2006.01)
(52) U.S. Cl. ........... 709/221; 726/14; 370/254; 370/431
(58) Field of Classification Search .................. 370/255, 370/338, 431, 329; 380/28, 270; 726/1, 726/14; 455/414.1; 709/227, 221, 229; 713/166
See application file for complete search history.

(56) References Cited

U.S. PATENT DOCUMENTS

| | | | |
|---|---|---|---|
| 7,120,129 B2 * | 10/2006 | Ayyagari et al. | 370/255 |
| 7,302,487 B2 * | 11/2007 | Ylonen et al. | 709/229 |
| 7,333,464 B2 * | 2/2008 | Yang et al. | 370/338 |
| 7,385,960 B2 * | 6/2008 | Bansal et al. | 370/338 |
| 2005/0193103 A1 * | 9/2005 | Drabik | 709/221 |
| 2005/0195778 A1 | 9/2005 | Bergs et al. | |
| 2005/0198221 A1 | 9/2005 | Manchester et al. | |
| 2006/0039306 A1 | 2/2006 | Iyer et al. | |
| 2006/0047784 A1 | 3/2006 | Li et al. | |
| 2006/0174102 A1 | 8/2006 | Smith et al. | |
| 2006/0239208 A1 | 10/2006 | Roberts et al. | |
| 2006/0282885 A1 | 12/2006 | Combs et al. | |
| 2006/0285518 A1 * | 12/2006 | Lin et al. | 370/329 |
| 2007/0036358 A1 * | 2/2007 | Nguyen et al. | 380/270 |
| 2007/0053508 A1 * | 3/2007 | Yasumoto | 380/28 |
| 2007/0189249 A1 * | 8/2007 | Gurevich et al. | 370/338 |
| 2007/0192596 A1 * | 8/2007 | Otsuka | 713/166 |
| 2007/0275701 A1 * | 11/2007 | Jonker | 455/414.1 |
| 2007/0283413 A1 * | 12/2007 | Shan et al. | 726/1 |
| 2008/0049779 A1 * | 2/2008 | Hopmann et al. | 370/431 |
| 2009/0070472 A1 * | 3/2009 | Baldus et al. | 709/227 |

* cited by examiner

*Primary Examiner* — Dustin Nguyen
(74) *Attorney, Agent, or Firm* — Toler Law Group, PC

(57) ABSTRACT

Methods and systems for configuring a network are provided. A method may include monitoring properties of a connection between a network device and a network. The method may also include detecting a change in the properties of the connection. The method may also include verifying the connection to the network is provided by a service provider when the change in the properties is detected and providing network configuration options based on the change.

22 Claims, 8 Drawing Sheets

SYSTEM AND METHOD FOR SECURING A WIRELESS NETWORK

CROSS REFERENCE TO RELATED APPLICATIONS

The present application claims priority from U.S. Provisional Patent Application No. 61/076,209 filed on Jun. 27, 2008 and entitled "SYSTEM AND METHOD FOR SECURING A WIRELESS NETWORK."

FIELD OF THE DISCLOSURE

The present disclosure is generally related to wireless networks and to securing a wireless network.

BACKGROUND

Each person in a typical home or small business may use one or more network devices, such as a personal computer, a laptop, a phone, or a personal digital assistant (PDA). Often, each network device may be capable of communicating with another network device using a wired protocol or a wireless protocol. An example of a wired protocol is Ethernet. Examples of wireless protocols include IEEE 802.11 ("Wi-Fi"), Bluetooth, Wireless Universal Serial Bus (USB), Code Division Multiple Access (CDMA), and Global System Mobile (GSM).

In order to allow each network device in the home or small business to communicate with an external network, such as the Internet, a wireless router, may be used to set up a wireless network, such as a Wi-Fi network. The wireless router may also be known as a wireless access point. The wireless router may have a wired connection to an external network, such as the Internet, and may broadcast a wireless signal to allow wireless-capable network devices access to the external network. Typically, the wireless router, and each device using the wireless router for wireless access, may be capable of being configured to secure the wireless network to prevent unauthorized access.

Configuring the wireless network to secure the network may include enabling and setting the wireless router's security settings and enabling and setting each network device's access settings based on the wireless router's security settings. Each network device must be precisely configured based on the wireless router's settings; otherwise, the network device may not be able to connect to the wireless network. Thus, the process of securing a wireless network for a home may be quite complex, making the process of securing a wireless network frustrating for users, especially for those who are not technically savvy. Therefore, there is a need for an improved system and method for securing a wireless network.

BRIEF DESCRIPTION OF THE DRAWINGS

FIG. 1 is a block diagram of an embodiment of a wireless network and a system to secure the wireless network;

FIG. 2 is a flow chart of a first illustrative embodiment of a method of securing a network;

FIG. 3 is a flow chart of a second illustrative embodiment of a method of securing a network;

FIG. 4 is a flow chart of a third illustrative embodiment of a method of securing a network;

FIG. 5 is a flow chart of a fourth illustrative embodiment of a method of securing a network;

FIG. 6 is a flow chart of a fifth illustrative embodiment of a method of securing a network;

FIG. 7 is a flow chart of a sixth illustrative embodiment of a method of securing a network; and FIG. 8 is a block diagram of an illustrative embodiment of a network device.

DETAILED DESCRIPTION OF THE DRAWINGS

In a particular embodiment, a method may include installing a first software on a first network device, the first software capable of configuring a first security setting of the first network device for access to a wireless network. The method may also include installing a second software on a second network device, the second software capable of configuring a second security setting of the second network device for access to the wireless network. The method may also include sending an indication from the second network device to the first network device to initiate a configuration of a security level for the wireless network. The method may also include configuring the security level at a router of the wireless network when the indication is received by the first network device. The method may also include configuring the first security setting by executing the first software. The method may also include configuring the second security setting by executing the second software.

In another particular embodiment, a system may include a wireless adapter capable of connecting to a wireless network, a processor, and a memory accessible to the processor. The memory including instructions executable by the processor to install software, the software capable of configuring a security setting for access to a wireless network. The memory further including instructions to initiate a configuration of a security level for the wireless network. The memory further including instructions to configure the security level at a router of the wireless network. The memory further including instructions to configure the security setting by executing the software based on the security level at a router.

In a particular embodiment, a method may include determining a wireless capability of a network device. The method may also include determining a security setting of the network device. The method may also include determining a security capability of a router. The method may also include displaying an indicator of the wireless capability of the network device to securely connect to the router. The method may also include receiving an indication to initiate a configuration of a security level and configuring the security level of the router. The method may also include configuring the security setting of the network device.

In a particular embodiment, a computer-readable medium is provided having a module containing instructions capable of being executed by a processor. The module may include instructions to install a first software on a first network device, the first software capable of configuring a first security setting of the first network device for access to a wireless network. The module may also include instructions to install a second software on a second network device, the second software capable of configuring a second security setting of the second network device for access to the wireless network. The module may also include instructions to send an indication from the second network device to the first network device to initiate a configuration of a security level for the wireless network. The module may also include instructions to configure the security level at a router of the wireless network when the indication is received by the first network device. The module may also include instructions to configure the first security setting by executing the first software. The module may also include instructions to configure the second security setting by executing the second software.

In a particular embodiment, a method may include registering a first network device as capable of accessing the wireless network after receiving a first registration request. The method may also include modifying a software for a second network device, the software capable of configuring a second security setting of the second network device for access to the wireless network. The method may also include sending the modified software to the second network device after receiving a software request from the second network device. The method may also include registering the second network device as capable of accessing the wireless network after receiving a second registration request. The method may also include sending the executor message to each network device capable of access to the wireless network after receiving an executor message identifying the executor.

Figure 1:
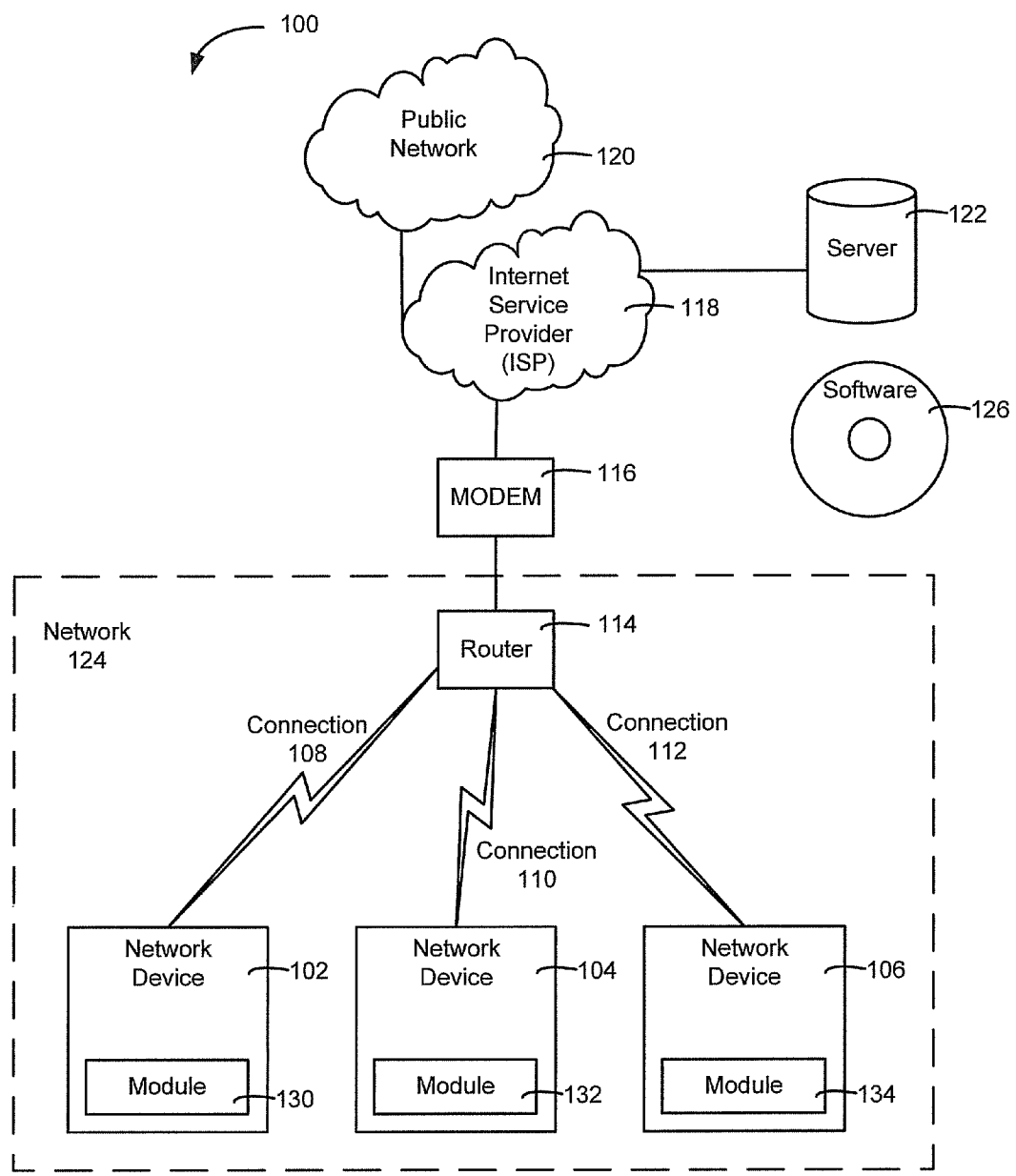

FIG. 1 is an illustrative embodiment of a network 100. In the network 100, network devices 102, 104, and 106 connect via connections 108, 110, and 112 to router 114. Each of the network devices 102-106 may be a personal computer, a laptop, a phone, a personal digital assistant (PDA), or any other device capable of connecting to a network. Each of the network devices 102-106 may be capable of communicating with another network device using a wired protocol, or a wireless protocol. Each connection in the connections 108-112 may be a wired connection or a wireless connection. A wired connection may use a wired protocol, such as Ethernet. A wireless connection may use a wireless protocol, such as Code Division Multiple Access (CDMA), Global System for Mobile (GSM), Bluetooth, Wireless Universal Serial Bus (USB), or IEEE 802.11 ("Wi-Fi").

The router 114 may be connected via a modem 116 to an Internet Service Provider (ISP) 118. The ISP 118 may provide access to a public network 120, such as the Internet. A server 122 may be accessible to ISP 118. The server 122 may be used to provide software for securing a network, such as the network 124. The server 122 may also register the network devices 102-106 belonging to a subscriber of the ISP 118 when securing the network 124.

The network devices 102, 104, and 106 may have modules 130, 132, and 134, respectively. Each module in the modules 130-134 may be stored in a memory (not shown) and contain instructions capable of being executed by a processor (not shown). Each of the modules 130-134 may be executed by a processor (not shown) to secure the network 124.

The network devices 102-106 and the router 114 may be part of the network 124. In this example, the network 124 is shown with three network devices, the network devices 102-106. However, the number of network devices in the network 124 may be fewer than three or greater than three. In order to secure the network 124, a software 126 may be installed on one network device of the network devices 102-106. For example, the software 126 may be first installed on the network device 102 as the module 130. The module 130 contains instructions capable of being executed by a processor. In one embodiment, the software 126 may be on a storage device accessible to the network device 102, such as a Compact Disc Read Only Memory (CD-ROM) or a Universal Serial Bus (USB) memory drive. In another embodiment, the software 126 may be supplied by the ISP 118 and downloaded from the server 122. If the software 126 is supplied by the ISP 118, then the server 122 may allow the software 126 to be downloaded only after determining that the router 114 or the modem 116 is owned by a subscriber of the ISP 118.

After the software 126 is installed on network device 102 as module 130, the module 130 may determine the capabilities of network device 102. For example, the module 130 may determine whether the network device 102 is capable of making a wireless connection with a wireless router, such as the router 114. The module 130 may also determine whether the router 114 has a private Internet Protocol (IP) address. The module 130 may determine the security features of the router 114, such as the type of encryption used by the router 114. For example, the type of encryption for a Wi-Fi network may be Wireless Encryption Protocol (WEP) or Wi-Fi Protected Access (WPA). The module 130 may determine the Service Set IDentifier (SSID) of the router 114. The module 130 may also determine the Basic Service Set Identifier (BSSID) of the router 114. In one embodiment, the module 130 may determine whether the router 114 or the modem 116 is owned by a subscriber of the ISP 118.

After analyzing the capabilities of the network device 102, the module 130 may display an indication of the capabilities of the network device 102. For example, the module 130 may use a traffic light metaphor to graphically indicate the capabilities of the network device 102. In the traffic light metaphor, a red light may indicate that the network device 102 is not capable of wireless networking; a yellow light may indicate that the network device 102 is wirelessly connected to the router 114, but that the wireless connection 108 has no security or the security is below a security threshold; and a green light may indicate that the network device 102 is wirelessly connected to the router 114 with an adequate amount of security. The module 130 may also provide a selection mechanism for a user to select whether the user wishes to secure the network 124. The network 124 may be secured by securing the router 114 and by securing each network device capable of wirelessly connecting to the router 114.

After a user indicates that the user wishes to secure network 124, the module 130 may begin the process of securing the network 124. In one embodiment, the module 130 may obtain information, such as a user-provided password, a user-requested SSID, the user's email address, the name of the network device 102, the type and the speed of the connection 108, and the wireless capabilities of the network device 102. The module 130 may register the information obtained with the server 122, after which the server 122 may supply a unique registration identifier to the module 130 for completing the process of securing the network 124.

The module 130 may request the user to go to the next network device, such as the network device 104, and install the software 126 on that network device as module 132. For example, the module 130 may instruct the user to open a web browser, such as Mozilla Firefox or Microsoft Internet Explorer, on the network device 104, navigate to a specified Uniform Resource Locator (URL) using the web browser, and download and install the software 126 on network device 104 as the module 132. In one embodiment, the software 126 may be on a storage device accessible to the network device 102, such as a CD-ROM or a USB memory drive. In another embodiment, the software 126 may be supplied by the ISP 118 and downloaded from the server 122. If the software 126 is supplied by the ISP 118, then server 122 may patch the software 126 using the information obtained by server 122 from the network device 102 when the information was registered with the server 122. After the software 126 is installed on the network device 104 as the module 132, the module 132 may be executed by a processor (not shown) to register the network device 104 with the server 122. The server 122 may record information indicating that network device 104 is part of the same network as network device 102. After the network device 104 is registered with the server 122, the network device 104 may scan the network 124 and record any discoverable SSIDs and BSSIDs for later use. The module 132 may be further executed to ask if there are any remaining network devices the user wishes to secure. If the user indicates there are more devices, then the process performed for network device 104 may be repeated for each additional network device in network 124.

In this example, the user may indicate that an additional network device is present. The module 132 may then request the user to go to the network device 106 and install the software 126 as the module 134. After the software 126 is installed on the network device 104 as the module 134, the module 134 may be executed by a processor (not shown) to register the network device 106 with the server 122 of ISP 118. The server 122 may record information indicating that network device 106 is part of the same network as network device 102 and network device 104. After the network device 106 registers with the server 122, the network device 104 may scan the network 124 and record any discoverable SSIDs and BSSIDs for later use. The module 134 may be further executed to ask if there are any remaining network devices the user wishes to secure. In this example, the user indicates there are no more devices because the software 126 has been installed on all the network devices 102-106 in the network 124.

After the software 126 has been installed on all the network devices 102-106 in the network 124, an executor may be selected from among the network devices 102-106 using several different criteria, such as the wireless capabilities of the network device, whether the network device is connected to the router 114 using a wireless or a wired connection, and the speed of the connection between the network device and the router 114. If more than one of the network devices 102-106 has the same or similar criteria, then the last network device on which software 126 was installed may be chosen. If none of the network devices 102-106 have a wired connection to router 114 then modules 130-134 may each display a message on their respective network devices requesting that the user either connect one of the network devices 102-106 to the router 114 using a wired connection, or enter a Media Access Control (MAC) address of a wireless adapter used by one of the network devices 102-106. A user may enter the MAC address of any one of the network devices 102-106 at any of the network devices 102-106. For example, a user may enter the MAC address of network device 104 at network device 102.

If the user connects one of the network devices 102-106 using a wired connection to the router 114, then the network device with the wired connection may be selected as the executor. For example, if the user connects network device 102 using a wired connection to router 114, then network device 102 may be selected as the executor, and the network devices 104-106 may be notified that the network device 102 has been selected as the executor. In one embodiment, after the user connects the network device 102 using a wired connection to router 114, module 130 may be executable by the processor to send a message to the server 122 indicating that the network device 102 is the executor. The server 122 may then send a message to network devices 104-106 identifying the network device 102 as the executor.

If the user enters a MAC address of a wireless adapter used by one of the network devices 102-106, the MAC address may be used to select an executor. The module on the network device at which the user entered the MAC address may be executed by the processor to select an executor. For example, if a user enters the MAC address at the network device 102, then the module 130 may be executed by the processor (not shown) to select an executor. The module may compare the BSSID of each network device to the entered MAC address and, if a BSSID matches the MAC address, then a network device from the network devices 102-106 which has the matching BSSID may be selected as the executor. If more than one of the network devices 102-106 has a matching BSSID, then the module may choose the executor from among the network devices with a matching BSSID based on a variety of criteria, including the connection speed of each network device with a matching BSSID, the signal strength of each network device with a matching BSSID, which network device was used to enter the MAC address, and which network device was last registered. After the module has chosen an executor, the module may notify all the network devices the identity of the network device which has been selected as the executor. In one embodiment, the module may send the server 122 a message identifying which network device from among the network devices 102-106 is selected as the executor, and the server 122 may send a message identifying which network device is selected as the executor to each of the network devices 102-106 identifying which of the network devices is selected as the executor. For example, the module may send the entered MAC address and the BSSID of the network device selected as the executor to the server 122, and the server 122 may then send the entered MAC address and the BSSID of the executor to each of the network devices 102-106. In one embodiment, the server 122 may determine whether the router 114 or the modem 116 has an internet protocol (IP) address of a subscriber of the ISP 118. The server 122 may notify the network devices 102-106 of the identity of the executor when the server 122 determines that the modem 116 has an IP address of a subscriber of the ISP 118.

After a network device from the network devices 102-106 receives a message identifying the executor, the network device may determine whether the network device is itself the executor. For example, if the network device 102 receives a message identifying the executor, then the network device 102 may determine whether the network device 102 is the executor. The network device, which determines that it is the executor, then may attempt to gain access to the router 114. The executor may use a pre-defined set of usernames and passwords in attempting to gain access to the router 114. The executor may also request a username and password for the router 114 from a user.

After the executor determines that the router 114 may be accessed, the executor device may ask the user if the user wishes to secure the network 124. If the executor determines that the user wishes to secure the network 124, then a message may be sent to all the network devices 102-106 indicating that the network 124 will be secured. In one embodiment, the executor may send a message to the server 122 indicating that the network 124 will be secured, and the server 122 may send a message to each of the network devices 102-106 to indicate that the network 124 will be secured. The network devices 102-106 may receive the message indicating that the network 124 will be secured, the executor may configure the router 114 for providing a secure wireless network based on the message. The non-executor network devices may also modify their wireless network access settings based on the message. For example, if the network device 102 is the executor and determines that a user wishes to secure the network 124, then the network device 102 may send a message to the network devices 104-106 indicating that the network 124 will be secured. In one embodiment, the network device 102 may send a message to the server 122 indicating that the network 124 is being secured, and the server 122 may send a message to network devices 102-106 indicating that the network 124 is being secured. The message sent to the server 122 and to the network devices 102-106 may contain information related to securing the network 124, such as an encryption key and an SSID. The network device 102 may then configure the router 114 to secure the network 124, and the network devices 104-106 may configure themselves to connect to the router 114 using the information in the received message.

After the network 124 is secured, each of the modules 130-134 in the network devices 102-106, respectively, may actively monitor and maintain the connections 108-112 to the router 114. For example, when the network device 106 is powered on or re-started, the module 134 may be executed by a processor (not shown) to monitor, configure, and/or maintain the connection 112 with router 114.

Figure 2:
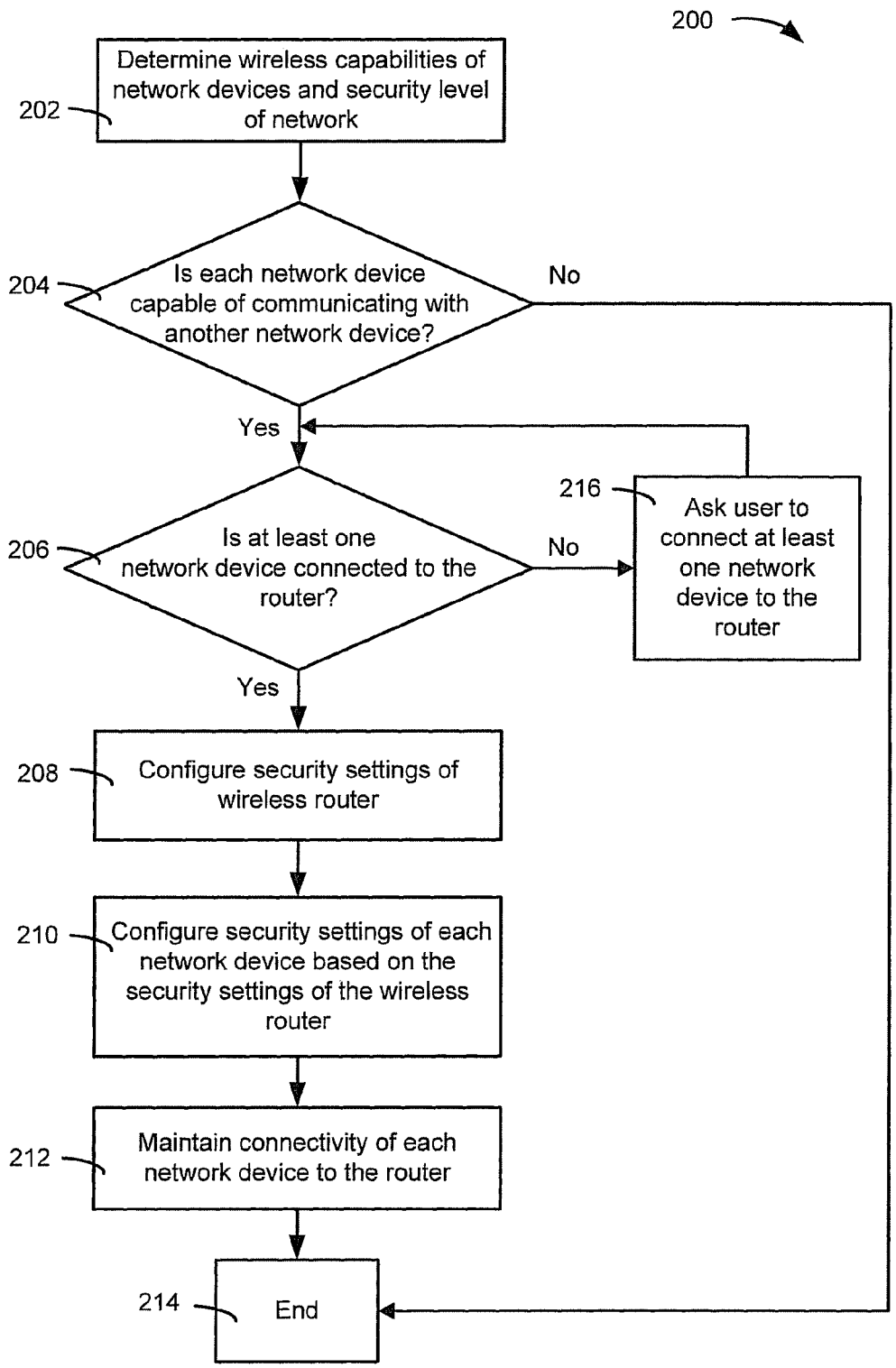

Referring to FIG. 2, a flow chart of a first illustrative embodiment of a method of securing a network is depicted and generally designated 200. The method 200 can be executed via a software module at a network device capable of connecting to the network, such as the network device 102, the network device 104, or the network device 106 in FIG. 1.

The method 200 may include determining the wireless capabilities of each network device and determining the security level of the network, at 202. For example, the network may be a network, such as the network 124 in FIG. 1. The wireless capabilities of each network device and the security level of the network may be determined by installing software, such as software 126 in FIG. 1, as a module on each network device.

A first determination may be made as whether each network device is capable of communicating with another network device, at 204. If each network device is capable of communicating with another network device, then a second determination may be made as to whether at least one network device is connected to a router, such as router 114 in FIG. 1, at 206. If the first determination is no, at 204, then the method ends, at 214. If no network device is connected to the router, at 206, a user is asked to connect at least one network device to the router, at 216. The method then returns to the second determination, at 206. If at least one network device is connected to the router, at 206, then the security settings of the router may be configured, at 208. For example, one of the network devices may be designated an executor, and the executor may access and configure the security settings of the router. The security settings may, for example, be Wireless Encryption Protocol (WEP), which may use a 40-bit encryption key, or Wi-Fi Protected Acesss (WPA), which may use a 128-bit encryption key.

The security setting of each network device may then be configured based on the security settings of the router, at 210. For example, the encryption key used to configure the router may be used to configure each network device. The connectivity of each network device to the router may then be maintained, at 212. For example, if the network device is restarted, the wireless connection of the network device may be reestablished. The method then ends, at 214.

Figure 3:
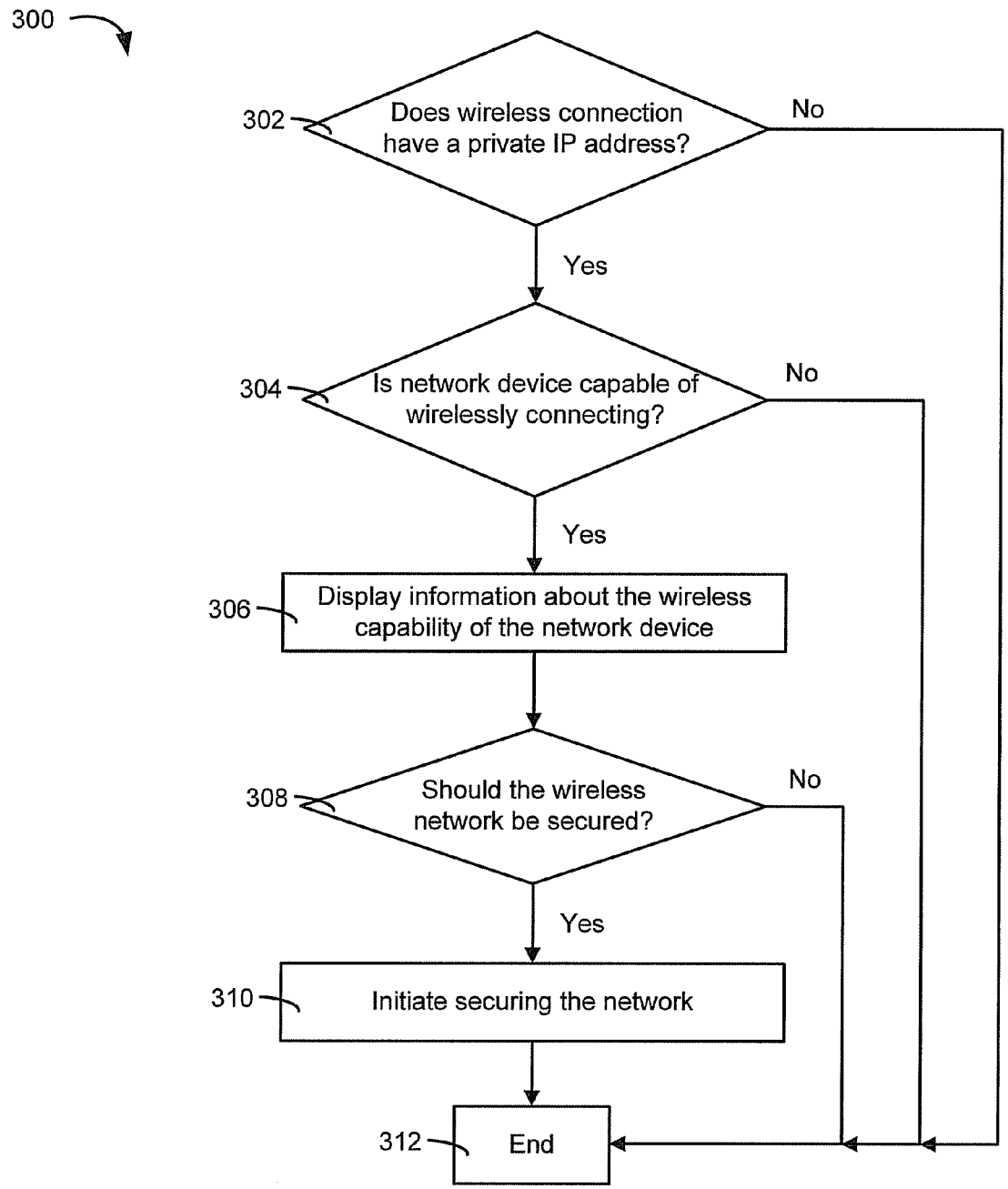

Referring to FIG. 3, a flow chart of a second illustrative embodiment of a method of securing a network is depicted and generally designated 300. The method 300 can be executed via a software module at a network device capable of connecting to the network, such as the network device 102, the network device 104, or the network device 106 in FIG. 1.

The method 300 may include determining whether the wireless connection has a private Internet Protocol (IP) address, at 302. If the wireless connection does not have a private address then the method ends, at 312. If the wireless connection has a private IP address, a determination may be made whether the network device is capable of wirelessly connecting to a network, at 304. If the networking device is not capable of wireless connecting to a network, the method ends, at 312. If the network device is capable of wirelessly connecting to a network, then information about the wireless capability of the network device may be displayed to a subscriber, at 306. For example, a red light may indicate that the network device is not capable of wireless networking; a yellow light may indicate that the network device is wirelessly connected to the router with no security or a security level below a threshold; and a green light may indicate that the network device is wirelessly connected to the router with an adequate level of security.

A determination may be made whether the network should be secured, at 308. For example, a user may be provide a selection mechanism for the user to select whether the user wishes to secure the network. Alternately, a previously set parameter may be used to determine whether to secure the network. For example, an ISP, such as the ISP 118, may set a parameter specifying that the security level of a network, such as the network 124, be equal to or above a threshold security level. If a determination is made that the network should be secured, then securing the network may be initiated, at 310, and the method 300 ends, at 312.

Figure 4:
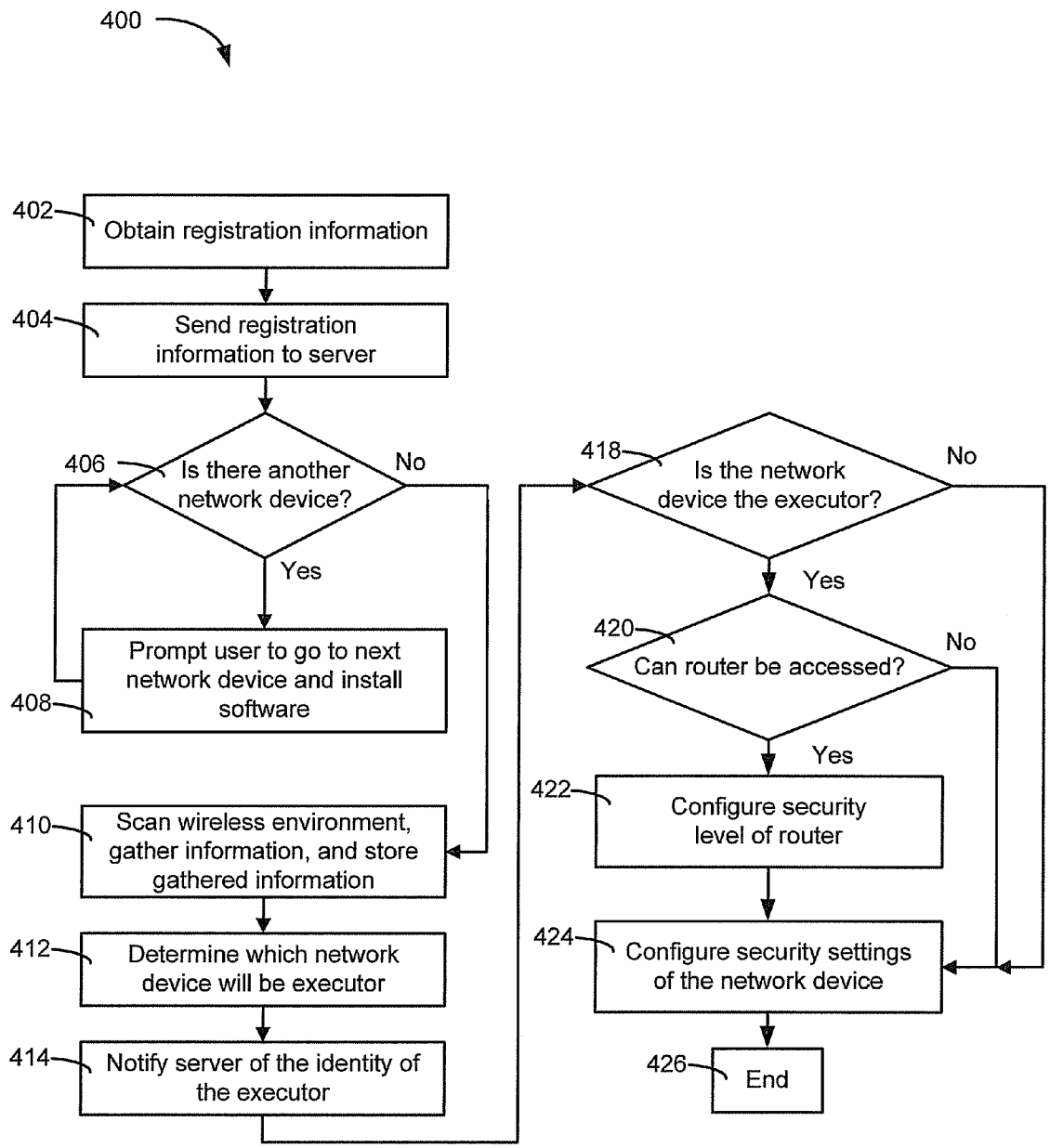

Referring to FIG. 4, a flow chart of a third illustrative embodiment of a method of securing a network is depicted and generally designated 400. The method 400 can be executed via a software module at a network device capable of connecting to the network, such as the network device 102, the network device 104, or the network device 106 in FIG. 1. The software module may, for example, be software, such as software 126, installed on a network device, such as network device 102.

The method 400 may include obtaining registration information, at 402. For example, a user may be prompted for registration information such as the user's email address, a password, or a desired Service Set Identifier (SSID). The software module may also obtain registration information from the network device, such as the network device's name, the connection capabilities of the network device to connect to the router, or the connection speed. If the network device is capable of connecting wirelessly to the network, the software module may also obtain the current SSID, the Basic Service Set Identifier (BSSID), or the strength of the router's wireless signal. Additional information may also be gathered, such as a local IP address, an operating system type, or an operating system version.

The registration information obtained may be sent to a server, at 404. A determination may be made as to whether the user wishes to add another network device, at 406. If the user wishes to add another network device, the user may be prompted to go to the next network device and install software on the next network device, at 408. For example, the user may be prompted to open a web browser, navigate to a specified location using the web browser, and download and install software on the network device. The software may be on a storage device accessible to the network device, such as a CD-ROM or a USB memory drive. Alternately, the software may be supplied by a server, such as the server 122 in FIG. 1. If the software is supplied by the server, then the server may patch the software for each network device using the registration information. The steps 406 and 408 may be repeated until the user indicates there are no more network devices to be added to the network.

Figure 5:
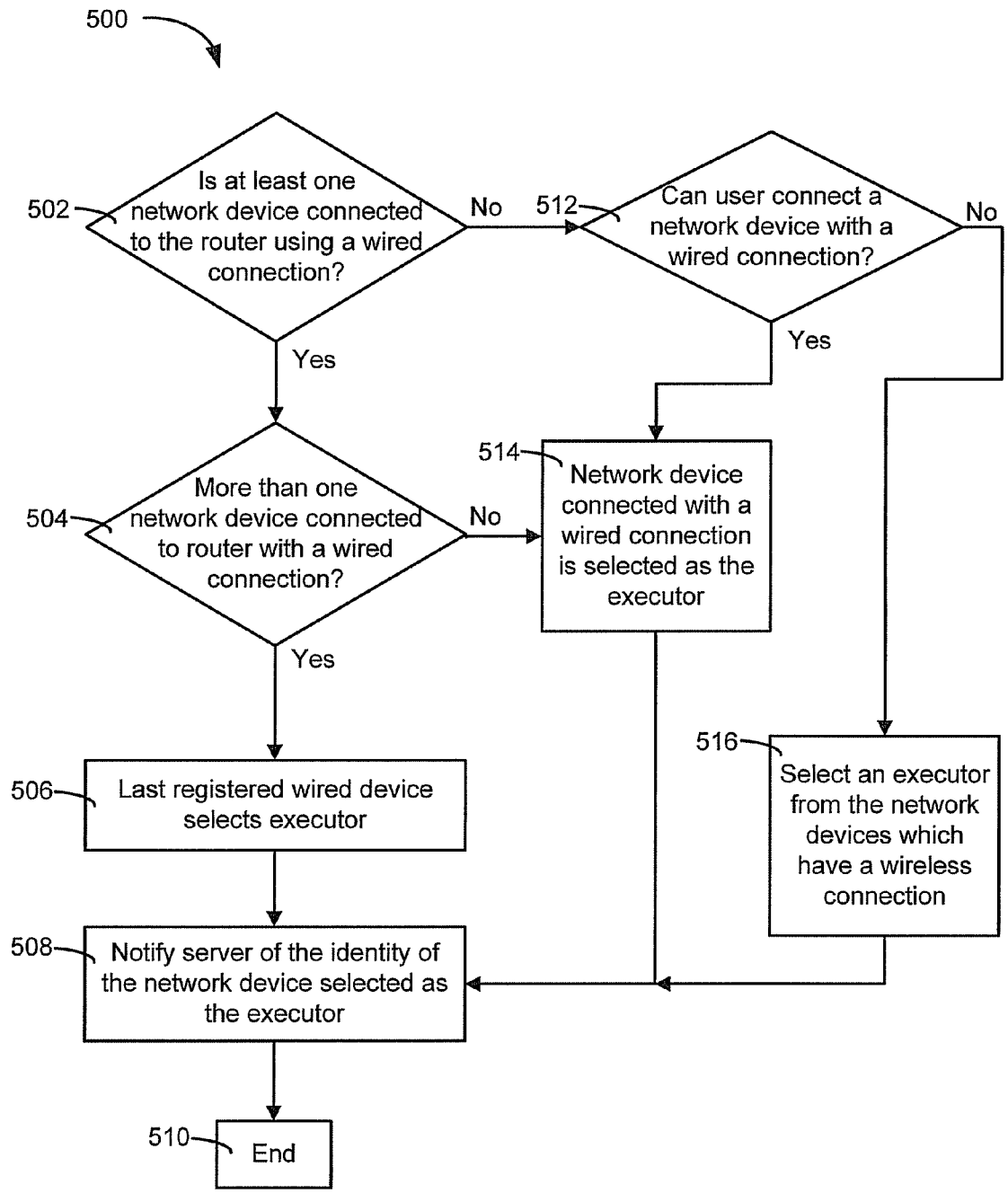
Figure 6:
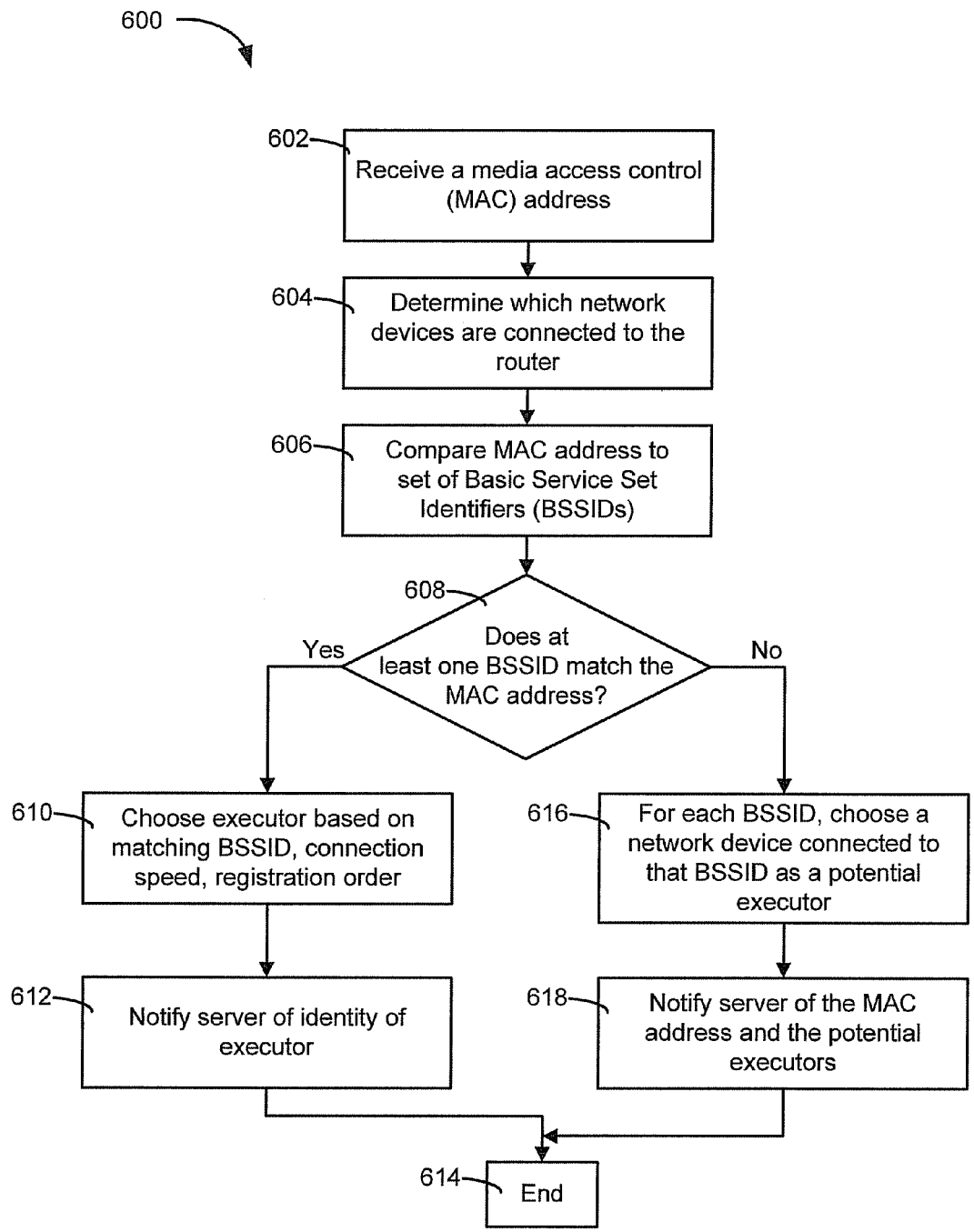
Figure 7:
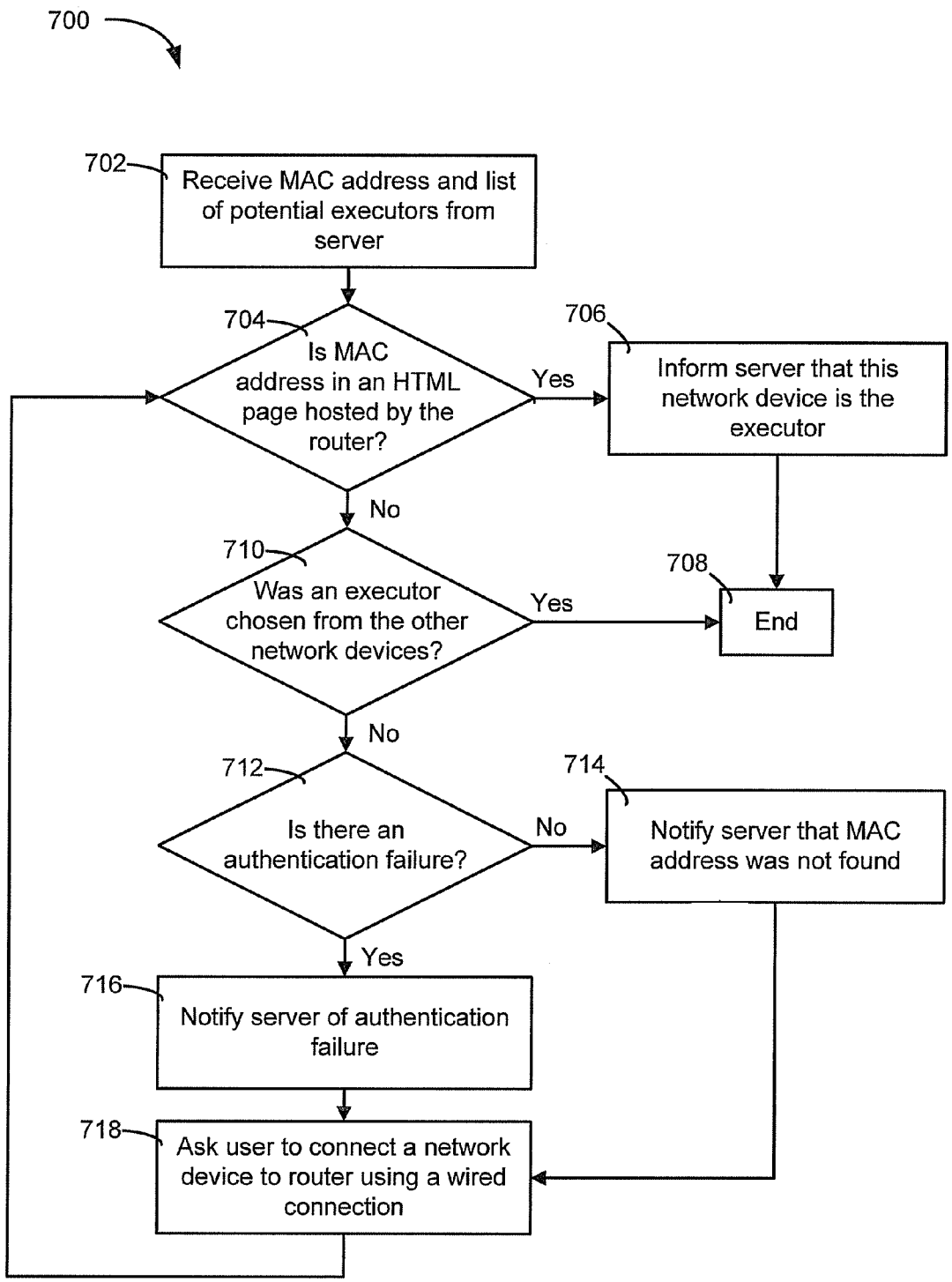

When there are no more network devices to be added to the network, then the wireless environment may be scanned, information may be gathered, and the gathered information may be stored at the network device. For example, if the network device has a Wi-Fi adapter, the wireless environment may be scanned using an 802.11 list scan function to record a list of SSIDs and BSSIDs for later use. A determination may be made as to which network device will be an executor, at 412. The executor is the network device that configures the security settings of the wireless router. FIGS. 5, 6, and 7 describe in more detail the method of determining the executor.

The server may be notified of the identity of the executor, at 414. A determination may be made as to whether the network device is the executor, at 418. If the network device is not the executor, because another network device was selected as the executor, the security settings of the network device may be configured, at 424, and the method 400 ends, at 426. If the network device is the executor, a determination may be made as to whether the router can be accessed, at 420. If the router cannot be accessed, the security settings of the network device may be configured, at 424, and the method 400 ends, at 426. If the router can be accessed, then the security level of the router may be configured, at 422. For example, the security level of the router may be configured by setting various parameters, including the SSID, the encryption type, or the encryption key. The security settings of the network device may be configured based on the security level of the router, at 424, and the method 400 ends, at 426. For example, the security settings of the network device may be configured using the SSID, the encryption type, and the encryption key used to set the security level of the router.

Referring to FIG. 5, a flow chart of a third illustrative embodiment of a method of securing a network is depicted and generally designated 500. The method 500 can be executed via a software module at a network device capable of connecting to the network, such as the network device 102, the network device 104, or the network device 106 in FIG. 1. For example, the software module may be software, such as software 126, installed on a network device, such as network device 102.

The method 500 is one example of how an executor may be chosen at step 412 of FIG. 4. The method 500 may include determining whether at least one network device is connected to the router using a wired connection, at 502. If at least one network device is connected to the router using a wired connection, then a determination may be made as to whether more than one network device is connected by a wired connection, at 504. If more than one network device is connected using a wired connection, then the last registered device connected by a wired connection may select the executor. The executor may be selected by taking into account a variety of data, such as the connection capabilities of each network device, the connection speed of each network device, or the order in which software was installed on the network devices, at 506. For example, the last registered device connected by a wired connection may select the executor by selecting the network device, which may also be capable of wirelessly connecting to the network. If more than one network device is connected by a wired connection and is also capable of a wireless connection, then from among those, the network device with the fastest wired connection may be selected as the executor. If more than one network device is connected by a wired connection, more than one network device is capable of wirelessly connecting, and more than one network device has the fastest wired connection, then from among those, the last network device at which software was installed may be selected as the executor. The server may be notified of the identity of the network device selected as the executor, at 508, and the method 500 ends, at 510.

If none of the network devices are connected to the router with a wired connection, the user may be requested to connect a network device with a wired connection, at 512. If the user is able to connect a network device with a wired connection, the network device connected with a wired connection may be chosen as the executor, at 514. The server may then be notified of the identity of the network device selected as the executor, at 508, and the method 500 ends, at 510.

If only one network device is connected with a wired connection, then the network device connected by a wired connection may be chosen as the executor, at 514. The server may be notified of the identity of the network device selected as the executor, at 508, and the method 500 ends, at 510.

If the user cannot connect one network device with a wired connection, then an executor may be selected from the network devices which have a wireless connection, at 516. An example of a method of selecting an executor from the network devices with a wireless connection is described in more detail in FIG. 6. The server may be notified of the identity of the network device selected as the executor, at 508, and the method ends, at 510.

Referring to FIG. 6, a flow chart of a third illustrative embodiment of a method of securing a network is depicted and generally designated 600. The method 600 can be executed via a software module at a network device capable of connecting to the network, such as the network device 102, the network device 104, or the network device 106 in FIG. 1. For example, the software module may be software, such as the software 126, installed on a network device, such as the network device 102.

The method 600 is an example of how an executor may be chosen at step 516 of FIG. 5. The method 600 may include receiving a media access control (MAC) address, at 602. For example, a user may be prompted to enter a MAC address at any one of the network devices. The MAC address may be the MAC address of a router, such as the router 114 in FIG. 1. A determination may made as to which network devices are connected to the router, at 604. The MAC address may be compared to a list of Basic Service Set Identifiers (BSSIDs), at 606. The list of BSSIDs may, for example, have been gathered and stored during a scan of the wireless environment, such as at 410 in FIG. 4.

A determination may be made whether at least one BSSID matches the MAC address, at 608. If at least one BSSID matches the MAC address, then the executor may be chosen based on the matching BSSID and other data, at 610. Other data may include the connection speed of the network device to the router, the signal strength of the wireless signal from the router at the network device, or the order in which the software was installed on each network device. For example, the network device at which the user entered the MAC address may be selected as the executor if the BSSID of the network device matches the MAC address and the connection speed and signal strength of the network device meet or exceed previously specified values. If more than one network device has a BSSID that matches the MAC address, then the network device with the best signal strength may be selected as the executor. If more than one network device has a BSSID that matches the MAC address, and they have the same signal strength, then the last network device on which the software was installed may be selected as the executor. The server may be notified of the identity of the executor, at step 612, and the method 600 ends, at 614.

If none of the BSSIDs match the MAC address, then, for each BSSID a network device connected to that BSSID may be chosen as a potential executor, at 616. The server may be notified of the MAC address and the set of potential executors, at step 618, and the method 600 ends, at 614. A set of potential executors may contain zero or more potential executors.

After a server, such as server 122, receives a MAC address and a set of potential executors, the server sends the MAC address and the set of potential executors to each network device that registered with the server. Each receiving device may then perform the method in FIG. 7.

Referring to FIG. 7, a flow chart of a fourth illustrative embodiment of a method of securing a network is depicted and generally designated 700. The method 700 can be executed via a software module at a network device capable of connecting to the network, such as the network device 102, the network device 104, or the network device 106, in FIG. 1. For example, the software module may be software, such as the software 126, installed on a network device, such as the network device 102.

The method 700 may include receiving a MAC address and a list of potential executors from the server, at 702. A determination may be made whether the MAC address is in a Hypertext Markup Language (HTML) page hosted by a router, at 704. If the MAC address was in an HTML page hosted by the router, then the server may be informed that this network device is the executor, at 706, and the method 700 ends, at 708. If the MAC address was not found in an HTML page hosted by the router, then a determination may be made as to whether an executor was chosen from the other network devices, at 710. If another network device was chosen as the executor, then the method 700 ends, at 708. For example, a server may send a message indicating that another device was chosen as the executor.

After a network device determines that the network device is the executor, the network device may notify the server, and the server may send a message notifying the other network devices that another network device is the executor. For example, in FIG. 1, if network device 106 finds the MAC address in an HTML page hosted by the router, then network device 106 may determine it is the executor and may notify server 122. The server 122 may then send a message to the network devices 102-106 in the network 124 notifying each network device that the network device 106 is the executor. The network devices 104-106 may then stop trying to determine whether they can be an executor.

If an executor was not chosen from the other network devices, then a determination may be made whether there is an authentication failure, at 712. If there is an authentication failure, then the server may be notified of the authentication failure, at 714. The user may then be asked to connect a network device to a router using a wired connection, at 716, and the method 700 returns to determining whether the MAC address is in an HTML page hosted by the router, at 704. If the MAC address is not in an HTML page hosted by the router, then the server may be notified that the MAC address was not found, at 718, and the method 700 returns to asking the user to connect a network device using a wired connection, at 716.

Figure 8:
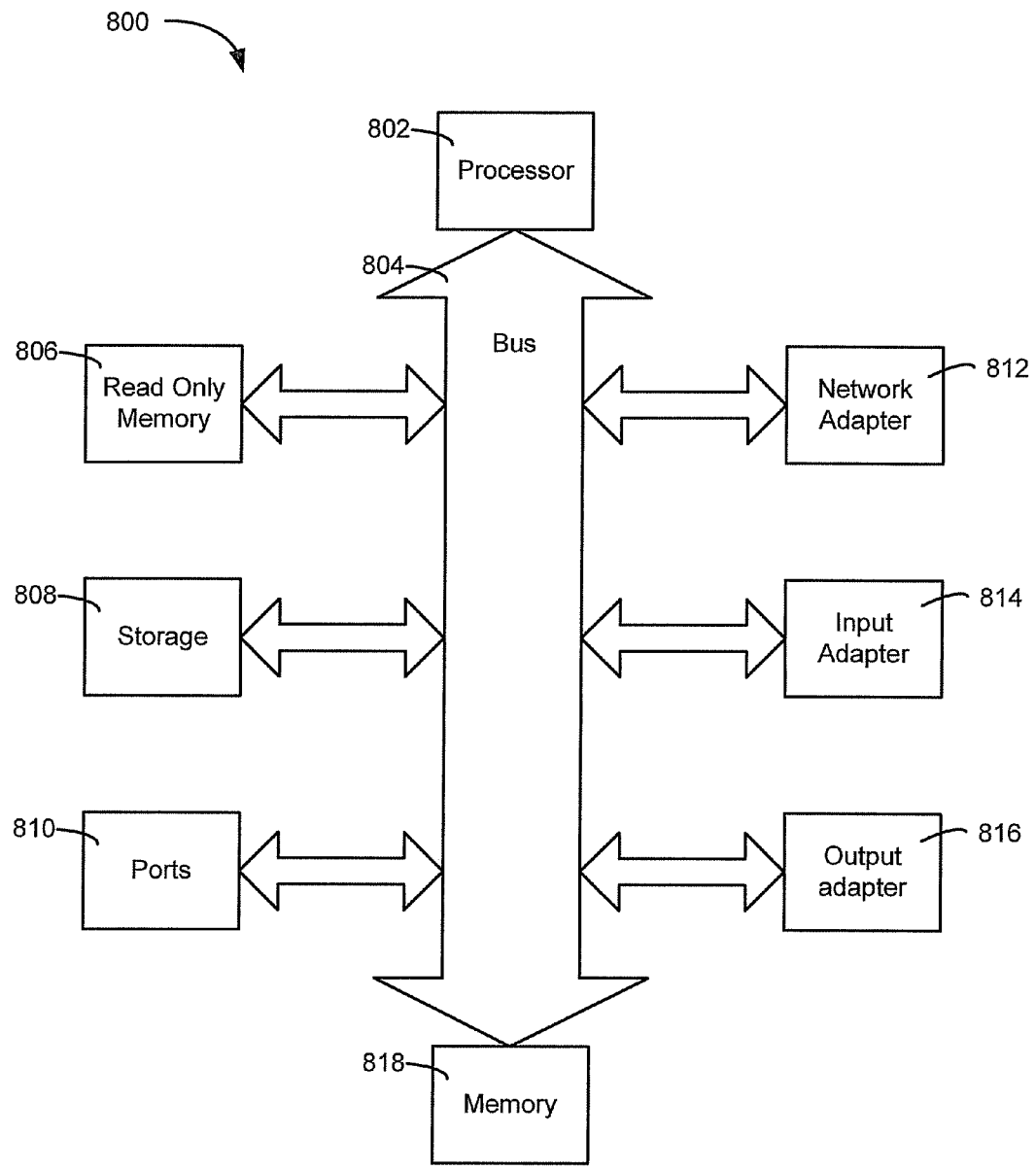

Referring to FIG. 8, a block diagram of an illustrative embodiment of a network device is depicted and generally designated 800. The network device 800 is an example of a network device, such as the network device 102, 104, or 106 in FIG. 1, in which a module, such as the modules 130, 132, or 134, respectively, may be located. In this illustrative embodiment, a processor 802 may connect to a bus 804. The processor 802 may be used to execute instructions contained in a module, such as the module 130 in FIG. 1. Connected to the bus 804 may be a read only memory 806. The read only memory 806 may contain instructions to load an operating system when the network device is powered on.

A storage 808 may also connect to bus 804. The storage 808 may be a data storage device, such as a hard disk drive, an optical storage drive, or a solid-state storage device, such as flash memory. Ports 810 may connect to the bus 804. The ports 810 may contain one or more ports, such as a Universal Serial Bus (USB) port, an Ethernet port, or an IEEE 1394 port. Network adapter 812 may connect to the bus 804. The network adapter 812 may be one or more adapters for connecting the network device 800 to different types of networks. For example, the network adapter 812 may be capable of wireless networking using a wireless connection protocol such as 802.11 ("Wi-Fi"), Wireless USB, Bluetooth, CDMA, or GSM.

An input adapter 814 may connect to the bus 804. The input adapter 814 may be capable of accepting input from one or more user input devices, such as a keyboard, a mouse, a speech recognition device, or a stylus. An output adapter 816 may also connect to bus the 804. The output adapter may be capable of outputting text and/or graphics to an output display device, such as a liquid crystal device (LCD) screen. A memory 818 may also connect to the bus 804. The memory 818 may contain a module, such as the module 130, executable by the processor 802.

In accordance with various embodiments of the present disclosure, the methods described herein may be implemented by software programs executable by a computer system. Further, the present disclosure contemplates a computer-readable medium that includes instructions to perform the methods described herein.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium: can include a solid-state memory such as a memory card or other package that houses one or more non-volatile read-only memories. Further, the computer-readable medium can be a random access memory or other volatile re-writable memory. Additionally, the computer-readable medium can include a magnetic, magneto-optical, or optical medium, such as a disc drive or tapes or other storage device. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
    a router to establish a local area network (LAN);
    a first device coupled to the LAN via the router, wherein the first device includes:
        a processor; and
        a memory coupled to the processor, the memory including instructions executable by the processor to:
            install security software;
            receive a command to secure the LAN with the security software;
            initiate a scan of the LAN in response to the command, wherein the scan gathers information about one or more devices, wherein each device is coupled to the LAN and includes the security software installed to the device;
            select an executor device from the one or more devices based on the information, the executor to configure the router;
            notify the one or more devices of an identity of the executor device;
            configure a security level of the router when the first device is the executor device;
            receive a message from the executor device after the executor device configures the security level of the router, wherein the message is sent to each of the one or more devices to enable the one or more devices to couple to the LAN via the router, and wherein the message includes security information; and
            configure the first device to connect to the LAN using the security information.

2. The system of claim 1, wherein the memory includes instructions executable by the processor to prompt a user to install the security software on a second network device of the local area network.

3. The system of claim 2, wherein the instructions to prompt a user to install the security software on the second network device further comprise instructions executable by the processor to:
    display a uniform resource locator for use with an internet browser;
    prompt the user to download the security software using the uniform resource locator; and
    prompt the user to install the security software on the second network device.

4. The system of claim 1, wherein the processor selects the executor device based at least in part on the executor device having a wired connection to the router.

5. The system of claim 4, wherein the processor sends an executor message to a server of an internet service provider associated with the router and the router forwards the executor message to the one or more network devices to notify the one or more network devices of the identity of the executor.

6. The system of claim 4, wherein the security information includes an encryption key used to configure the security level of the router.

7. A non-transitory computer readable medium comprising computer readable instructions, wherein the computer readable instructions are executable by a processor to:
    install security software to a first network device of a local area network (LAN), wherein the LAN is established by a router coupled to the first network device;
    cause the security software to be installed on a second network device of the LAN;
    scan the LAN to gather information about one or more network devices that include the installed security software in response to a command to secure the LAN;
    select an executor device from the one or more network devices that include the installed security software;
    notify the one or more network devices that include the installed security software of an identity of the executor device;
    configure a security level of the router with the first network device when the executor device is the first network device;
    receive a message from the executor device, wherein the message is sent to each of the one or more network devices that include the installed security software to enable the one or more network devices that include the installed security software to couple to the LAN via the router, and wherein the message includes security information; and
    configure the first network device to connect to the LAN with the security information.

8. The non-transitory computer readable medium of claim 7, wherein the computer readable instructions to cause the security software to be installed on the second network device of the local area network further comprise computer readable instructions to prompt a user to install the security software on the second network device.

9. The non-transitory computer readable medium of claim 8, wherein the computer readable instructions further comprise computer readable instructions to:
  display a uniform resource locator for use with an internet browser;
  prompt the user to download the security software using the uniform resource locator; and
  prompt the user to install the security software on the second network device.

10. The non-transitory computer readable medium of claim 7, wherein the executor device configures the security level of the router and sends the message when the executor device is not the first network device.

11. The non-transitory computer readable medium of claim 10, wherein the computer readable instructions further comprise computer readable instructions to prompt a user to couple at least one of the one or more network devices that include the installed security software to the router by a wired connection in response to determining that none of the one or more network devices that include the installed security software are coupled to the router by a wired connection, wherein the executor device is selected from one or more of the network devices coupled to the router by the wired connection in response to the prompt.

12. The non-transitory computer readable medium of claim 10, wherein the security information includes an encryption key used to configure the security level of the router.

13. A method comprising:
  receiving a registration request from a network device of a local area network (LAN) at a server, wherein the network device includes installed security software;
  registering, at the server, the network device as a registered network device of the LAN, wherein each registered network device of the LAN includes the installed security software;
  receiving an identifier of an executor device at the server from a particular registered network device of one or more registered network devices of the LAN, wherein the executor device is selected by the particular registered network device from the one or more registered network devices of the LAN to configure a security level of a router that establishes the LAN;
  sending via the server an executor message to the one or more registered network devices of the LAN;
  receiving security information at the server from the executor device in response to security configuration of the router by the executor device; and
  sending a lockdown message to the one or more registered network devices of the LAN via the server, wherein the lockdown message includes the security information to enable the one or more registered network devices to couple to the LAN via the router.

14. The method of claim 13, further comprising, prior to receiving the registration request from the network device, sending the security software to the network device.

15. The method of claim 14, wherein sending the security software to the network device further comprises:
  sending the security software to the network device after determining that the network device is associated with a subscriber of a communications service.

16. The method of claim 13, wherein the lockdown message enables each network device of the one or more registered network devices of the local area network to securely couple to the router.

17. A method comprising:
  receiving a command at a first network device that includes installed security software to secure a local area network (LAN), wherein the LAN includes at least one network device with the installed security software;
  gathering information about the at least one network device with the installed security software at the first network device in response to the command;
  determining at the first network device an executor to configure a security level of the LAN from the at least one network device with the installed security software based on the information;
  sending a first message to each network device of the at least one network device with the installed security software via the first network device, wherein the first message includes an identifier of the executor, and wherein the executor configures a security level of the LAN and sends a second message with security information to each network device of the at least one network device with the installed security software to enable each network device of the at least one network device with the installed software to couple to the LAN via the router; and
  executing the security software at the first network device to configure the first network device to connect to the LAN based on the security information from the second message.

18. The method of claim 17, wherein the command is received from a user of the local area network.

19. The method of claim 17, wherein the command is received from an internet service provider.

20. The method of claim 19, wherein the command is selectively sent by the internet service provider based on a comparison of a threshold security level to a parameter that specifies a security level of the local area network.

21. The method of claim 19, wherein a particular network device of the at least one network device with the installed security software downloaded the security software from a server associated with the internet service provider.

22. The method of claim 17, wherein the first network device displays an indication of network capabilities of the first network device after installation of the security software on the first network device.

* * * * *